United States Patent [19]

White

[11] Patent Number: 4,794,760

[45] Date of Patent: Jan. 3, 1989

[54] DIRECT DRIVE MOTORIZED ACUTATOR CONTROL FOR BLEED VALVES

[75] Inventor: Robert C. White, La Mesa, Calif.

[73] Assignee: Sunstrand Corporation, Rockford, Ill.

[21] Appl. No.: 108,082

[22] Filed: Oct. 14, 1987

[51] Int. Cl.[4] .................................................. F02C 9/18

[52] U.S. Cl. .................................. 60/39.07; 60/39.29; 251/129.05; 318/603

[58] Field of Search ............................ 60/39.07, 39.29; 415/27, 28; 251/129.05, 129.11; 318/603, 628; 377/77

[56] References Cited

U.S. PATENT DOCUMENTS

| | | | |
|---|---|---|---|
| 3,307,824 | 3/1967 | Weisheit | 251/129.05 |
| 3,659,417 | 5/1972 | Grieb | 60/39.07 |
| 3,874,407 | 4/1975 | Griswold | 251/129.05 |
| 4,258,301 | 3/1981 | Kawa | 318/603 |
| 4,380,893 | 4/1983 | Stokes et al. | 60/39.07 |
| 4,463,300 | 7/1984 | Mayne et al. | 318/603 |

*Primary Examiner*—Louis J. Casaregola
*Attorney, Agent, or Firm*—Antonelli, Terry & Wands

[57] ABSTRACT

An improved direct drive motorized actuator control for a bleed valve in a gas turbine engine is disclosed. Position information of the bleed valve is produced by processing of a velocity signal derived from sensing motion of the bleed valve into a synthetic position signal having a magnitude proportional to the number of pulses contained in the velocity signal and a sign which is a function of the direction of rotation. The movement of the bleed valve is controlled by a control signal which is a function of the difference between a valve positioning command and the synthetic position signal. The sign of the synthetic position signal is controlled as a function of the control signal. The synthetic position signal has a time constant which causes it to decay with time to prevent the accumulation of error in the system. The invention achieves precise control of the bleed valve without utilization of expensive absolute position feedback circuitry.

5 Claims, 3 Drawing Sheets

DIRECT DRIVE MOTORIZED ACUTATOR CONTROL FOR BLEED VALVES

BACKGROUND OF THE INVENTION

1. Field of the Invention

The present invention relates to systems for achieving positional control of moveable elements without an absolute position feedback system. More particularly, the invention relates to a system for precisely controlling the positioning of a bleed valve in a gas turbine engine without the usage of an absolute position feedback system.

2. Description of the Prior Art

Gas turbine engines are in use which provide a variable quantity of compressed air from the engine compressor by a movable bleed valve and an output shaft which provides a power takeoff. The total power which can be drawn by the compressed air ducted by the bleed valve and the output shaft can exceed the rated horsepower of the engine. In order to avoid the possibility of operating gas turbine engines of the aforementioned type at power levels exceeding the rated horsepower of the engine, bleed valve control systems have been developed which reduce the amount of air being ducted by the bleed valve until the demand for compressed air and shaft output power is not greater than the rated power of the engine. These bleed valve control systems monitor the actual exhaust gas temperature and reduce the amount of air being ducted so that the actual exhaust gas temperature does not exceed the rated maximum exhaust gas temperature of the engine thereby insuring that the output power does not exceed the rated power.

FIG. 1 illustrates a block diagram of a prior art system for controlling a bleed valve in a gas turbine. The system 10 controls the positioning of a bleed valve of the bleed valve and gas turbine 12 to ensure that the maximum rated output horsepower of the gas turbine is not exceeded by the combined horsepower drawn by the positioning of the bleed valve to duct compressed air and the shaft output. During operation, when the total horsepower being drawn by ducting of compressed air and output shaft horsepower varies, the positioning of the bleed valve is controlled so that when the sensed exhaust gas temperature exceeds a maximum exhaust gas temperature (M.E.G.T.), the bleed valve is closed so that the amount of compressed air ducted by the bleed valve is reduced until the actual exhaust gas temperature (E.G.T.) is equal to or less than the M.E.G.T. A valve positioning command, which is equal to the difference between the M.E.G.T. and the E.G.T., is applied to a differential amplifier 14 which produces an output signal proportional to the difference between the valve positioning command and an absolute position signal outputted by position feedback system 16. The position feedback system 16, which may be any known position feedback system, such as a synchro, potentiometer, mechanical or optical encoder or proportional optical device, provides an output signal directly proportional to the absolute position of the bleed valve. The output signal from the proportional amplifier 14, which may be differential amplifier, is applied to a pulse width control circuit 18 which produces a series of output pulses having a width which varies in direct proportion to the output signal and is synchronized with the output frequency of clock 20. The pulse width control may be implemented by an absolute value amplifier which produces an output signal directly proportional to the absolute value of the output signal from differential amplifier 14. The output of the absolute value amplifier is applied to a comparator which compares the magnitude of the absolute value output signal with a ramp signal synchronized at the basic clock frequency which rises from a zero level at the initiation of each cycle of the clock. The comparator produces an output signal having a duration from the beginning of the clock's cycle until the point at which the value of the ramp signal exceeds the magnitude of the output signal from the absolute value. A pair of flip-flops 22 and 24, respectively, control the opening and closing of the bleed valve. The flip-flops 22 and 24 may be implemented as D-type flip/flops of known construction. The output signal from the differential amplifier 14 is also coupled to a direction control 26 which is implemented as a zero crossing detector and inverter to produce output signals Q and $\overline{Q}$ which respectively are the data inputs for flip-flops 22 and 24. The output signal Q is high when the polarity of the output signal from the differential amplifier 14 has a first sign (positive or negative) and is low when the polarity of the output signal has the other sign. The output signal $\overline{Q}$ has a bistable level which is opposite that of the signal Q. As long as the data signal to either of the flip-flops 22 or 24 is high, the output from that flip-flop has a pulse duration equal to the duration of the pulse produced by the pulse width control 18. Accordingly, the width of the pulses for opening or closing the bleed valve are directly proportional to the pulse width of the pulses outputted by the pulse width control 18. As soon as the data signal goes low to either of the flip-flops 22 or 24, signifying that a change in direction of the movement of the bleed valve 12 should occur, the output of the flip-flop 22 or 24 which was high goes low until an opposite change in direction occurs at a later time.

While the operational control produced by this system is satisfactory in achieving an overall control characteristic for the gas turbine such that the total of the power outputted from the engine in the form of shaft horsepower and compressed air does not exceed the maximum rated power for the gas turbine engine, it suffers from the disadvantage of requiring expensive position feedback controls in its implementation.

SUMMARY OF THE INVENTION

The present invention provides an improved control system for positioning a direct drive actuator without the usage of an absolute position feedback system. Moreover, the invention achieves precise control of the direct drive actuator by electrical processing of a velocity feedback signal proportional to the velocity of the direct drive actuator and a position command for the actuator. This system has the advantage that relatively inexpensive, highly reliable velocity pickups, which do not require mechanical contact, can be used as the only sensor of the operation of the direct drive actuator without requiring the usage of a position feedback sensor as in the prior art.

In a broad sense, a control system in accordance with the present invention for a moveable element driven by a direct drive actuator which is varied in position during the operation of an operating system includes a generator of a positioning command to cause the direct drive to move to a desired position; a velocity sensor for producing a signal proportional to a sensed velocity of movable element of the direct drive actuator; a controller, responsive to a control signal for controlling the position of the direct drive actuator; a generator, responsive to the control signal and the velocity signal, for generating a synthetic position signal proportional to the position of the direct drive actuator; and a circuit, responsive to the positioning command and the synthetic position signal for generating the control signal, the control signal being proportional to the difference between the positioning command and the synthetic position signal In a preferred embodiment, the velocity signal is comprised of a number of pulses having a frequency directly proportional to the sensed velocity of the movable element of the direct drive actuator. A summer totals the number of pulses of the velocity signal. The total number of pulses summed in the summer increases when the direction signal has a first magnitude and decreases when the direction signal has a second magnitude. The direction signal may be generated by detecting the zero crossing points of the control signal which is a function of the difference between the positioning command and the synthetic position signal. Each time a zero point is crossed signifies a change in direction and therefore a reference position. A high level signal may be assigned to the output signal of the zero crossing detector when the difference between the error signal and the synthetic position signal is one sign and a low level may be assigned to the output signal when the difference is the other sign.

A system for controlling a bleed valve driven by a direct drive actuator in a gas turbine in accordance with a preferred embodiment of the invention includes a generator for generating a valve positioning command to position the bleed valve in a desired position; a controller for controlling the operation of the direct drive actuator which opens and closes the bleed valve in response to a control signal, the controller causing the bleed valve to open when the control signal has a first sign and to close when the control signal has a second sign; a velocity sensor for producing a velocity signal proportional to a sensed velocity of a movable element of the direct drive actuator which moves in opening or closing the bleed valve; a generator, responsive to the velocity signal and control signal sign for generating a synthetic position signal having a level proportional to the position of the movable element; a generator, responsive to the synthetic position signal and the valve positioning command, for generating the control signal, the control signal being a function of a difference between the synthetic position signal and the valve positioning command.

Furthermore, the controller may be provided with a dead band at which no change in the position of the bleed valve occurs when the magnitude of the control signal is below a predetermined absolute magnitude.

As used herein, the term "synthetic position signal" means a signal which is derived from a signal proportional to velocity without an absolute position reference.

DESCRIPTION OF THE PREFERRED EMBODIMENT

Figure 1:
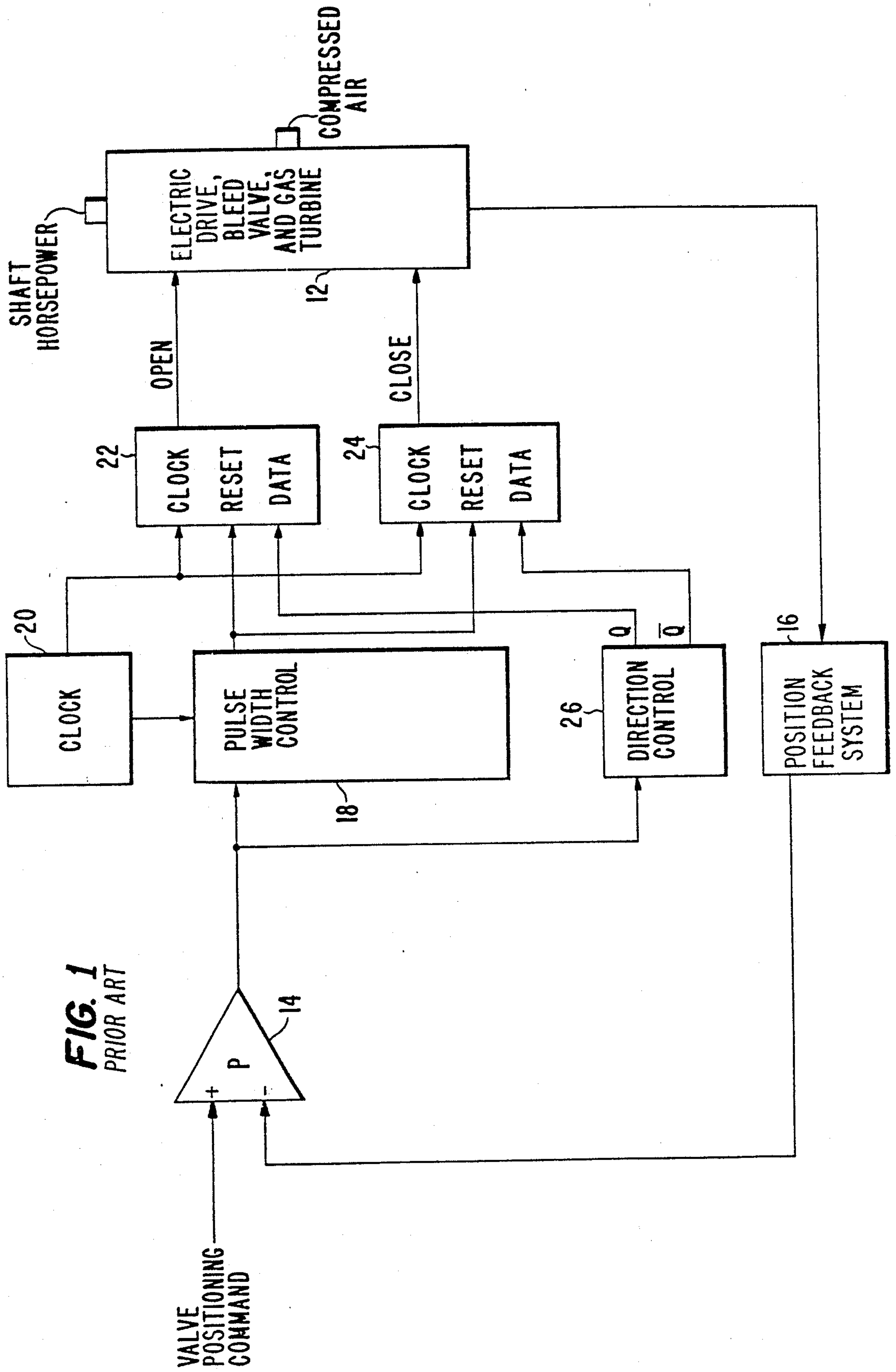
FIG. 1 PRIOR ART
FIG. 1 is a block diagram of a prior art system for controlling the positioning of a bleed valve in a gas turbine engine.
Figure 2:
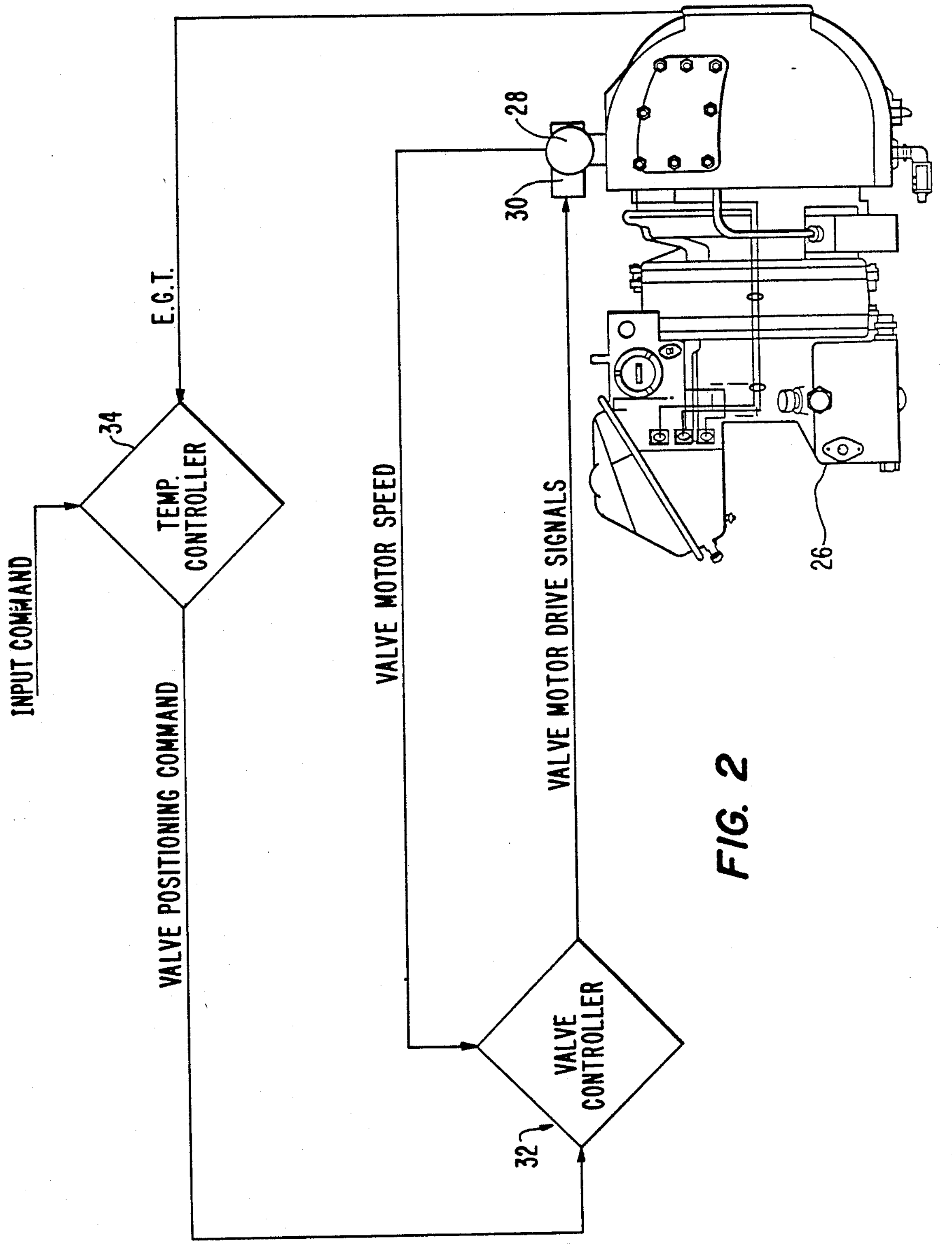
FIG. 2 is a generalized block diagram of a control system in accordance with the present invention.

FIG. 2 illustrates a generalized block diagram of a control system in accordance with the present invention. A gas turbine engine 26, which is of conventional construction, such as those used as auxiliary power units for providing output shaft horsepower and ducted compressed air, is controlled by the invention to prevent operation of the engine above the maximum rated output horsepower. An outside control loop is provided which is comprised of an E.G.T. sensor (not illustrated), a temperature controller 34, valve controller 32 and a direct drive actuator 30, which may be mechanical or electrical but preferably is an electric motor. The bleed valve 28 ducts compressed air from the compressor section of the gas turbine 26 in accordance with the known method of operation. The directly driven actuator 30 drives the bleed valve. A tachometer (not illustrated), outputs a series of pulses proportional in frequency to the velocity of the electrically driven actuator which are processed by a valve controller 32 as described below. The temperature controller 34, produces a valve positioning command, described above with respect to FIG. 1, to cause the bleed valve to be positioned for ducting a desired amount of air to be bled in accordance with the command. The valve positioning command is applied to a valve controller 32 which produces valve motor drive signals applied to direct drive actuator 30 as described below to open and close the bleed valve. An inside control loop controls the direct drive actuator 30 which is comprised of the aforementioned tachometer, valve controller 32 and electric actuator 30. The inside control loop has a faster response time than the outside loop. A preferred embodiment of the valve controller 32 is described below with respect to FIG. 3. It should be noted that the system of FIG. 2 achieves precise positioning of the bleed valve without the prior art requirement of an expensive position absolute feedback system with the utilization of an inexpensive velocity sensor which senses the rate of rotation of the bleed valve and electronically processing of the sensed speed of the electrically powered actuator to produce a synthetic position signal to control the position of the bleed valve as a function of the difference between the synthetic position signal and a valve positioning command as described below.

Figure 3:
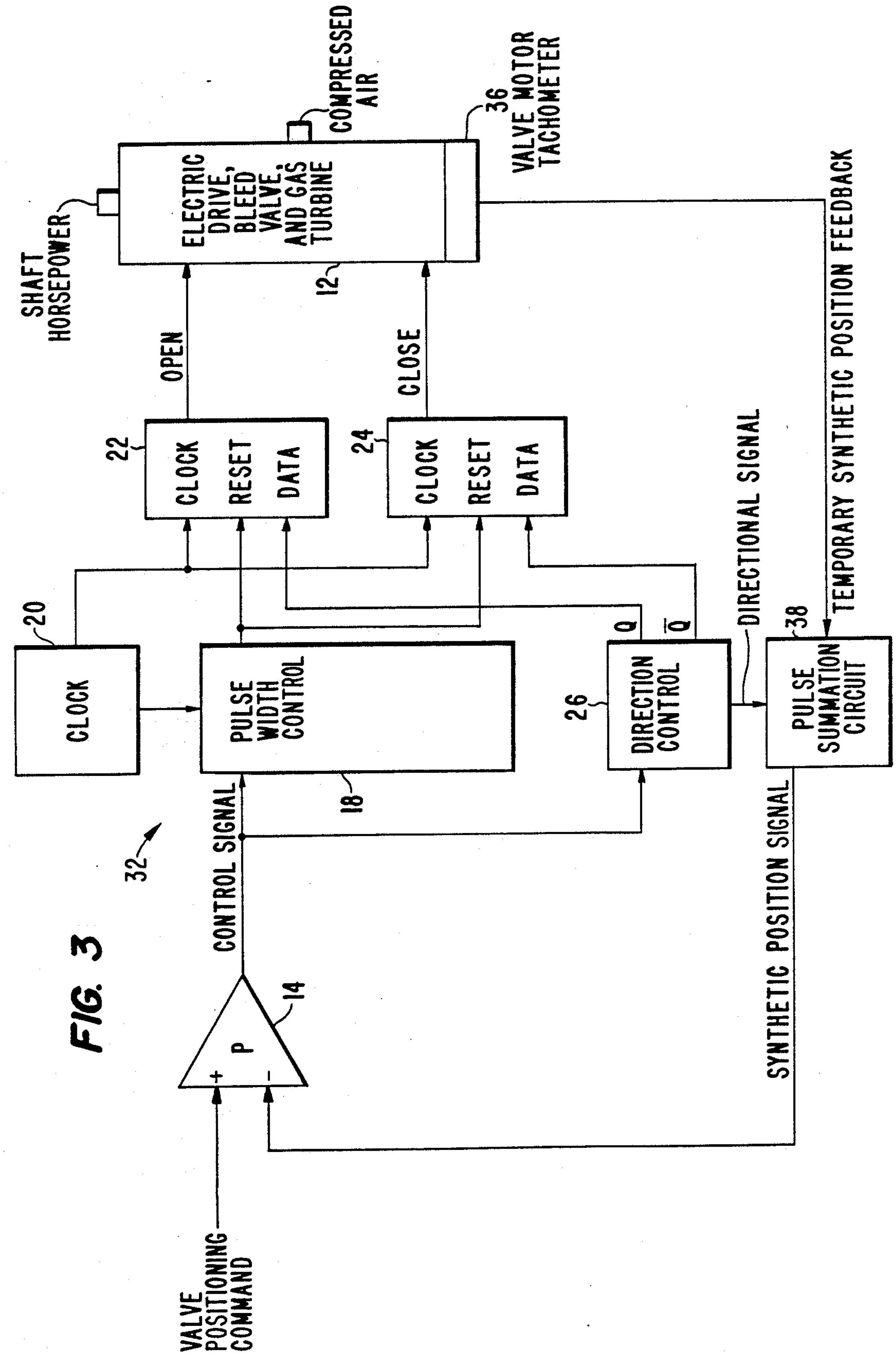
FIG. 3 is a detailed block diagram of the control system in accordance with the present invention.

FIG. 3 illustrates a block diagram of a preferred embodiment of the present invention. Like reference numerals are used to identify like parts in FIGS. 1 and 3. The present invention eliminates the usage of an expensive absolute position feedback system to control the operation of the bleed valve of the electric drive, bleed valve and gas turbine 12. The positioning of the bleed valve to achieve the overall operational of the prior art system of FIG. 1 is achieved by replacing the position feedback system 16 of the prior art of FIG. 1 with a bleed valve shaft tachometer 36, which outputs a series of pulses proportional to the speed of the bleed valve shaft, a summer 38 which outputs a synthetic position signal having a magnitude proportional to the position of the bleed valve and direction control circuit 26 which outputs a direction signal for controlling the operation of the summer 38.

When the direction signal is high, the direction control 26 causes the summer 38 to increase the magnitude of the synthetic position signal in direct proportion to the number of received pulses and when the direction control signal is low, the direction control 26 causes the summer 38 to decrease the magnitude of the synthetic position in direct proportion to the number of received pulses. The summer 38, which may be either analog (integrator) or digital (counter) has a bleed time constant which causes the count to decay. The time constant should be greater than the time constant of the outside control loop including the temperature controller 34. Preferably, the time constant should be an order of magnitude greater than the time constant of the outside control loop to avoid adverse effects between the inside control loop of FIG. 3 and the outside control loop. The time constant may be provided by an RC shut circuit which bleeds the stored count. The purpose of the bleed off time constant is to prevent an accumulation of positional error which could cause the bleed valve to stop at an erroneous position. Since the magnitude of the pulses outputted by tachometer 36 is proportional to velocity, movement of the bleed valve at slow speeds cannot be accurately reflected in the total in the summer 38. The pulse width control 18 is provided with a dead band zone centered around the zero value of the control signal at which the operation of the bleed valve ceases to avoid hunting. The dead band may be provided by an absolute value amplifier and a threshold detection of the absolute value amplified signal. When the amplified signal is below the threshold, a zero level output signal is produced which disables the motor drive for the bleed valve. The control signal may have a positive or negative sign depending on the resultant sum of the synthetic position signal and the valve positioning command. The sign of the control signal from the proportional amplifier 14 controls the direction control 26 in the same manner as the prior art system of FIG. 1.

The signals produced by the various components in the block diagram of FIG. 3 during operation are described as follows. The proportional amplifier 14 differentially amplifies the valve positioning command and the synthetic position signal to produce the control signal, which has either a positive or a negative sign for controlling the pulse width of the pulse train outputted by the pulse width control 18. When the sign of the control signal changes, the direction control circuit 26 changes state to cause the data input to on of the flip-flops 22 and 24 to go low and the other input to go high. The change in data states of Q and $\overline{Q}$ causes the direction of the bleed valve shaft as driven by the electric drive, bleed valve and gas turbine 12 to change direction. The change in sign of the control signal also causes the level of the direction signal to change state which controls the summer 38 to change its mode of accumulating the pulses from the tachometer as described above.

While the preferred embodiment of the invention has been described as utilizing an electrically powered actuator, it should be understood that the invention may be practiced with actuators powered by non-electrical sources.

While the invention has been described in terms of a preferred embodiment, it should be understood that numerous modifications may be made thereto without departing from the spirit and scope of the invention as defined in the appended claims. It is intended that all such modifications fall within the scope of the claims.

I claim:

1. A system for controlling a bleed valve driven by a direct drive actuator in a gas turbine comprising:

(a) means for generating a valve positioning command for causing the valve to move to a desired position;

(b) means for controlling the operation of a direct drive actuator which opens and closes the bleed valve in response to a control signal applied thereto, the means for controlling causing the bleed valve to open when the control signal has a first sign and to close when the control signal has a second sign;

(c) means for producing a velocity signal proportional to a sensed velocity of a movable element of the direct drive actuator which moves in opening or closing the bleed valve;

(d) means, responsive to the velocity signal and to the control signal, for generating a synthetic position signal having a level proportional to the position of the movable element; and (e) means, responsive to the synthetic position signal and the valve positioning command, for generating the control signal, the control signal being proportional to the difference between the valve positioning command and the synthetic position signal and having a positive or negative sign.

2. A system for controlling a bleed valve in accordance with claim 1 wherein the means for controlling causes a current position of the direct drive actuator to be maintained when the magnitude of the control signal is below a predetermined magnitude.

3. A system for controlling a bleed valve in accordance with claim 1 wherein:

(a) the means for producing a velocity signal produces a series of pulses having a frequency proportional to the sensed velocity; and (b) the means for generating the synthetic position signal comprises means coupled to the means for producing a velocity signal for summing the total of the pulses to produce the synthetic position signal and means responsive to the control signal, for producing a direction signal, the direction signal being coupled to the means for summing for applying the pulses to increase the synthetic position signal when the direction signal has a first sign and for applying the pulses to decrease the synthetic position signal when the direction signal has a second sign.

4. A control system for a movable element driven by a direct drive actuator which is varied in position during the operation of an operating system comprising:

(a) means for producing a positioning command to cause the direct drive actuator to move to a described position;

(b) means for producing a velocity signal proportional to a sensed velocity of a movable element of the direct drive actuator;

(c) means, responsive to a control signal and the velocity signal for generating a synthetic position signal having a level proportional to the position of the movable element and a positive sign when the movable element is moving in a first direction and a negative sign when moving in the second direction;

(d) means, responsive to the synthetic position signal and the positioning command, for generating the control signal, the control signal being proportional to the difference between the positioning command and the synthetic position signal; and (e) means, responsive to the control signal for causing the direct drive actuator to move in a first direction when the sign of the control signal is a first sign and to move in a second direction when the sign of the control signal is a second sign.

5. A control system in accordance with claim 4 wherein:

(a) the velocity signal is comprised of a series of pulses having a frequency directly proportional to the sensed velocity of the movable element; and (b) the means for generating the synthetic position signal comprises means coupled to the means for producing a velocity signal for summing the total of the pulses to produce the synthetic position signal, and means responsive to the control signal for producing a direction signal, the direction signal being coupled to means for summing for applying the pulses to increase the synthetic position signal when the direction signal has a first sign and for applying the pulses to decrease the synthetic position signal when the direction signal has a second sign.

* * * * *